United States Patent
Wu et al.

(10) Patent No.: US 12,254,164 B2
(45) Date of Patent: Mar. 18, 2025

(54) METHOD FOR INFORMATION DISPLAY, TERMINAL AND STORAGE MEDIUM

(71) Applicant: BEIJING XIAOMI MOBILE SOFTWARE CO., LTD., Beijing (CN)

(72) Inventors: Baolin Wu, Beijing (CN); Zetan Pei, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 199 days.

(21) Appl. No.: 17/976,142

(22) Filed: Oct. 28, 2022

(65) Prior Publication Data

US 2024/0036700 A1 Feb. 1, 2024

(30) Foreign Application Priority Data

Jul. 28, 2022 (CN) .......................... 202210901218.9

(51) Int. Cl.
*G06F 3/04817* (2022.01)
*G06F 9/451* (2018.01)

(52) U.S. Cl.
CPC .......... *G06F 3/04817* (2013.01); *G06F 9/451* (2018.02)

(58) Field of Classification Search
CPC .... G06F 3/04817; G06F 3/0481; G06F 9/451; H04M 1/72469
USPC ........................... 345/501; 709/206; 715/788
See application file for complete search history.

(56) References Cited

U.S. PATENT DOCUMENTS

| | | | |
|---|---|---|---|
| 10,269,063 B2 * | 4/2019 | Ruebush | G06Q 40/03 |
| 2015/0331573 A1 * | 11/2015 | Zhu | G06F 3/0482 |
| | | | 715/788 |
| 2016/0353150 A1 * | 12/2016 | Hashimoto | H04N 21/6433 |
| 2021/0149693 A1 * | 5/2021 | Yang | G06Q 50/01 |
| 2021/0200391 A1 * | 7/2021 | Xiao | G06F 3/0482 |
| 2023/0155967 A1 * | 5/2023 | Huang | G06F 3/04817 |
| | | | 709/206 |

FOREIGN PATENT DOCUMENTS

WO WO 2022017411 A1 1/2022

OTHER PUBLICATIONS

European Patent Application No. 22204127.9, Search and Opinion dated Aug. 14, 2023, 7 pages.

* cited by examiner

*Primary Examiner* — Prabodh M Dharia
(74) *Attorney, Agent, or Firm* — Cozen O'Connor

(57) ABSTRACT

A method and an apparatus for information display includes a user interface with flexible control of icons. The method for interacting with information displayed on a terminal includes displaying key information of an information display interface of an application in a corner mark corresponding to an icon of the application; and receiving a first control instruction for the corner mark, and displaying the information display interface on a display screen of the terminal.

17 Claims, 5 Drawing Sheets

METHOD FOR INFORMATION DISPLAY, TERMINAL AND STORAGE MEDIUM

TECHNICAL FIELD

The present disclosure relates to a field of terminals, especially to a method for information display, a terminal and a storage medium.

BACKGROUND

With the rapid development of the electronic and communication industry, the performance of various terminals with a touch screen (such as various types of smart phones, tablet computers, etc.) has been continuously improved, and may support more and more complex applications (APPs). Icons of various applications installed on a terminal are displayed on a display screen of the terminal. For an application that applies "a corner mark (also known as "a little red dot")" technology, when a new message is received (for example, an instant messaging message), a color-dotted corner mark (usually in red) is displayed in the upper right corner of the icon of the application. The corner mark may further include a number indicating the number of new messages received. That is, the above corner mark is generally configured to prompt the number of unread messages of a corresponding application.

SUMMARY

According to embodiments of the present disclosure, a method for information display is provided, and performed by a terminal. The method for information display includes: displaying key information of an information display interface of an application in a corner mark corresponding to an icon of the application; and receiving a first control instruction for the corner mark, and displaying the information display interface on a display screen of the terminal.

According to embodiments of the present disclosure, a terminal is provided, and the terminal includes: a processor; a memory configured to store instructions executable by the processor; the processor is configured to perform the method for information display as described in the first aspect.

According to embodiments of the present disclosure, a non-transitory computer readable storage medium is provided. When instructions in the storage medium are executed by a processor of a terminal, the terminal is caused to perform the method for information display as described in the first aspect.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following exemplary embodiments do not represent all implementations consistent with the present disclosure. Rather, they are merely examples of apparatuses and methods consistent with some aspects of the disclosure as detailed in the appended claims.

A method for information display is provided in the embodiment of the disclosure, and performed by a terminal. In the method, a corner mark may be configured for an icon of an APP, and key information of an information display interface corresponding to the APP is displayed in the corner mark corresponding to the APP. The user may control the corner mark so that a corresponding information display interface may be displayed on a display screen, which provides more functions for the corner mark and enhances valid information of the corner mark, facilitating the user to perform quick operation and interaction, and improving the user experience.

Figure 1:
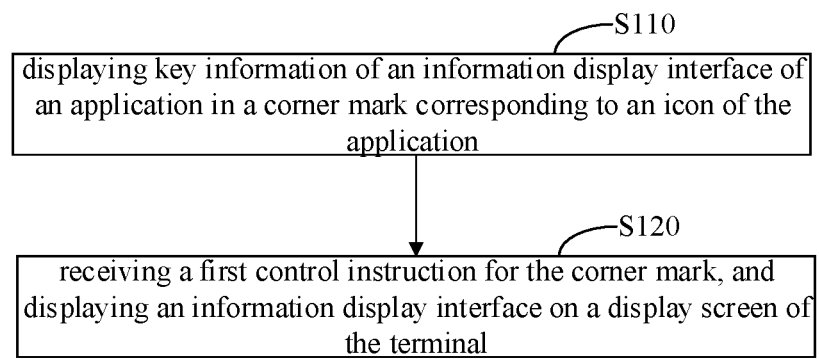
FIG. 1 is a flowchart illustrating a method for information display according to an embodiment of the disclosure.

In an example embodiment, a method for information display is provided, and to the method is performed by a terminal. As illustrated in FIG. 1, the method may include following steps S110-S120.

At S110, key information of an information display interface of an application is displayed in a corner mark corresponding to an icon of the application.

At S120, a first control instruction for the corner mark is received, and an information display interface is displayed on a display screen of the terminal.

At S110, the information display interface may be configured based on actual requirements. For example, the information display interface may be a video play interface of a video application, or may be a chat interface of a communication application, which is not limited in the disclosure.

The key information may be relatively essential information in the information display interface, or may be identification information indicating an information display interface, which is not limited here. For example, when the information display interface is a video play interface, the key information may be prompt information configured to prompt that there is an update to a video. For example, when the information display interface is a chat interface, the key information may be the number of unread messages and a corresponding sender. Key information may also be of other types based on different information display interfaces, which is not limited here.

The corner mark is an identifier displayed at a preset position (for example, an upper right corner) on an icon of an application. The preset position may be configured based on actual requirements, for example, may be an upper left corner, a lower left corner and a lower right corner, which is not limited here.

In some embodiments, each application corresponds to one icon, and the icon is displayed in the display screen of the terminal. The icon may correspond to one corner mark. The corner mark may be configured to display the key information of an information display interface, so as to facilitate the user to learn about the status of the information display interface in time.

At S120, the user may input the first control instruction to the terminal by means of a touch manner, or may input the first control instruction to the terminal through other ways, which is not limited here.

When the terminal detects that a touch operation satisfies a preset trigger condition, it is determined that the first control instruction for the corner mark is received.

The trigger condition may be long pressing the corner mark for a duration greater than a set duration. The set duration may be set based on actual requirements, and the specific value of the set duration is not limited. For example, the set duration may be 3 seconds. The set duration may be set before the terminal leaves the factory, or may be set after the terminal leaves the factory, which is not limited here. In addition, after the set duration is set, the set duration may be modified subsequently to better satisfy different requirements of the user.

The trigger condition may also be that the number of consecutive clicks performed on the corner mark within 2 seconds is greater than or equal to a set number. The set number may be set based on actual requirements, and the specific value is not limited. For example, the set number may be three. The setting manner of the set number may refer to that of the set duration, which will not be repeated here.

It should be noted that, the user may set the trigger condition based on the usage habit of the user, and is not limited to the above manner.

In some embodiments, when the terminal determines that the first control instruction for the corner mark is received, the information display interface corresponding to the above corner mark may be displayed on the display screen of the terminal, to facilitate the user to quickly open the information display interface.

With the method according to embodiments of the disclosure, the user may make the display screen display a corresponding information display interface by controlling the corner mark, which provides more functions for the corner mark and enhances valid information of the corner mark, facilitating the user to perform quick operation and interaction, and improving the user experience.

The technical solution according to embodiments of the present disclosure may include the following beneficial effect: in the disclosure, the corner mark is configured for the icon of the application (APP), and the key information of the information display interface corresponding to the APP is displayed in the corner mark corresponding to the APP. The user may make the display screen display the corresponding information display interface by controlling the corner mark, which provides more functions for the corner mark and enhances valid information of the corner mark, facilitating the user to perform quick operation and interaction, and improving the user experience.

In an embodiment, a method for information display is provided, and performed by a terminal. In the method, the information display interface may include a notification display interface corresponding to notification information.

In some embodiments, the application includes a video application, the notification information includes video update information of a favorite video, and the key information includes update prompt information configured to prompt an update of the favorite video.

Figure 2:
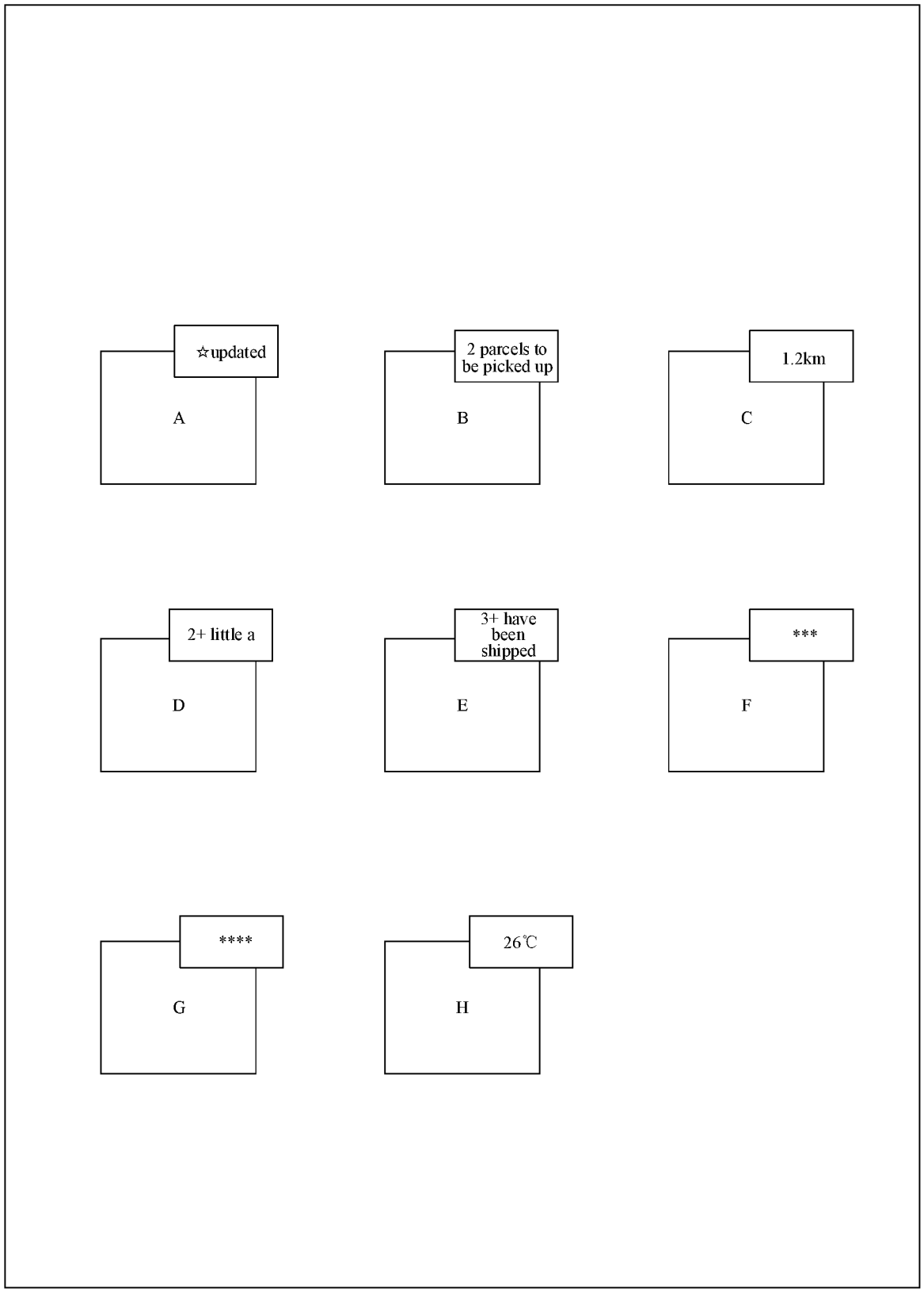
FIG. 2 is a schematic diagram illustrating a display screen (without displaying a preset interface) of a terminal according to an embodiment of the disclosure.
Figure 3:
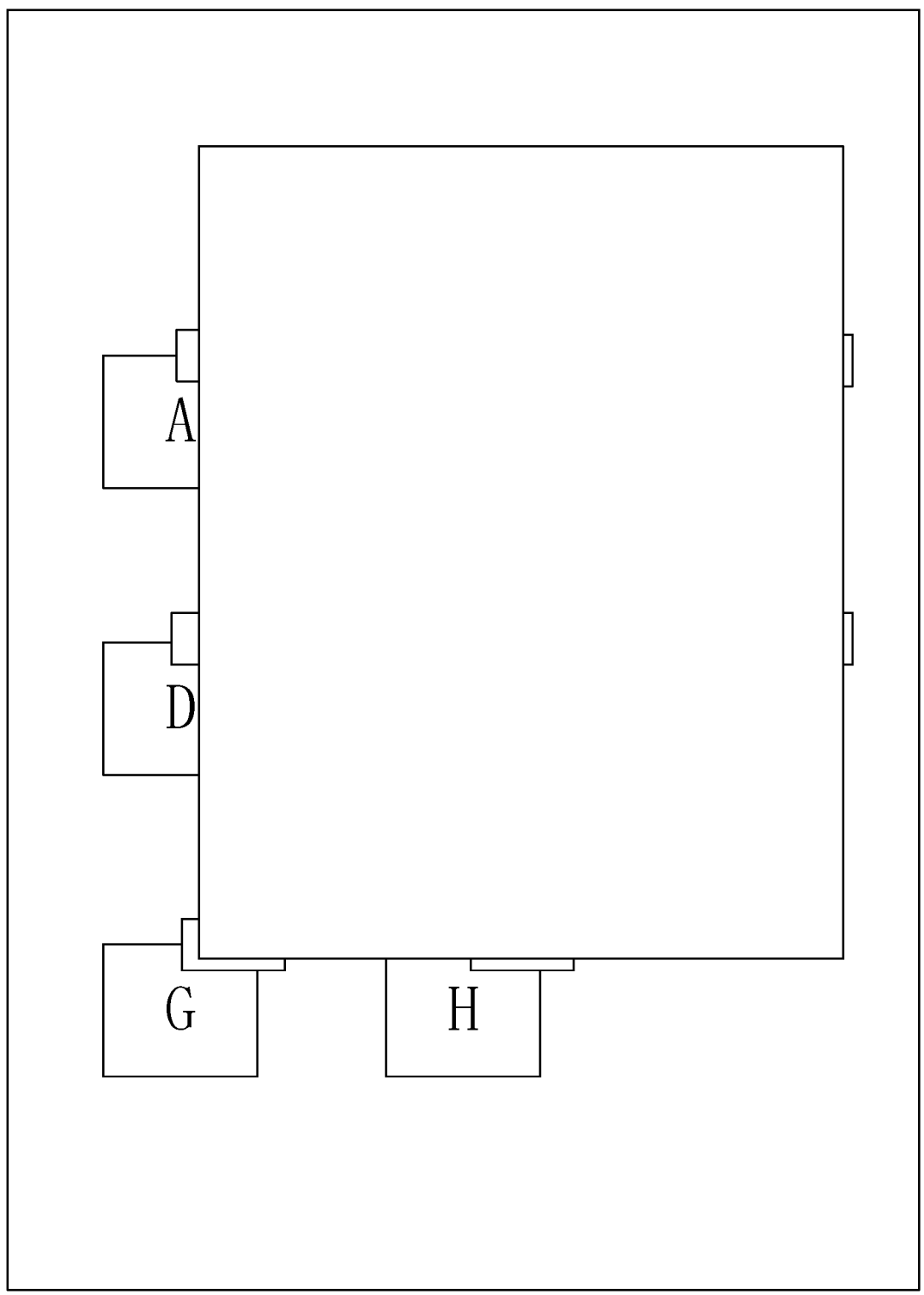
FIG. 3 is a schematic diagram illustrating a display screen (displaying a preset interface) of a terminal according to an embodiment of the disclosure.

In some embodiments, as illustrated in FIG. 2, the application may be a video application A. When a favorite video of the user is updated, the notification information may be video update information of the favorite video, and the information display interface (as illustrated in FIG. 3) may be an interface displaying the notification information. That is, the information display interface may be a video update interface of the favorite video. The key information may be prompt information indicating that the favorite video is updated. For example, the key information may be prompt information "☆ updated", where ☆ generally represents "favorite".

It should be noted that, when the application includes a video application, the notification information may include other types of information in addition to the type of information above, which is not limited here. In addition to the above prompt information, the key information may include other prompt information, which is not limited here.

In some embodiments, the application may include an express application, the notification information may include information about parcels to be picked up, and the key information may include express prompt information indicating a number of parcels to be picked up.

In some embodiments, as illustrated in FIG. 2, the application may be an express application B. When the number of parcels to be picked up by the user is 2, the notification information may include information about the parcels to be picked up, such as a tracking number, an express type, a recipient's tail number of the mobile phone number and a pickup number of the parcels to be picked up. The information about the parcels to be picked up may also be other information, which is not limited herein. The information display interface (as illustrated in FIG. 3) may be an interface that displays the above notification information. The key information may be prompt information indicating that there are two parcels to be picked up. For example, the key information may be text prompt information "2 parcels to be picked up".

It should be noted that, when the application includes an express application, the notification information may include other types of information in addition to the type of information above, which is not limited herein. In addition to the prompt information, the key information may include other prompt information, which is not limited herein.

In some embodiments, the application includes a food delivery application, the notification information includes food delivery order information, and the key information includes food-delivery prompt information indicating a distance between the food ordered and a buyer.

In some embodiments, as illustrated in FIG. 2, the application may include a food delivery application C. When a user purchases a takeout food on the food delivery application C, the notification information may include food delivery order information such as a predicted delivery time, a remaining delivery distance, and a delivery status of the food delivery order of a user. The food delivery order information may also include other information, which is not limited here. The information display interface (as illustrated in FIG. 3) may be an interface where the food delivery order information is located. The key information may be prompt information of the remaining delivery distance of the above food delivery order. For example, when the remaining delivery distance is 1.2 km, the key information may be "1.2 km".

It should be noted that, when the application includes the food delivery application, the notification information may include other types of information in addition to the type of information above, which is not limited here. In addition to the prompt information, the key information may include other prompt information, which is not limited herein.

In some embodiments, the application includes a communication application, the notification information includes information of one or more unread messages, and the key information includes communication prompt information indicating a number of the unread messages and/or a sender.

In some embodiments, as illustrated in FIG. 2, the application may be a communication application D, and the notification information may include an unread message. The information display interface (as illustrated in FIG. 3) may be an interface where the unread message is located. The key information may be prompt information indicating a number of the unread messages and a sender. For example, when the number of the unread messages is 2, and the sender is little a, the key information may be prompt information "2+ little a". It should be noted that, in the key information, an identifier such as an avatar of the sender may be configured to indicate the sender, which is not limited here.

It should be noted that, when the application includes the communication application, the notification information may include other types of information in addition to the type of information above, which is not limited here. In addition to the prompt information, the key information may include other prompt information, which is not limited here.

In some embodiments, the application includes a shopping application, the notification information includes information about an item to be received, and the key information includes shopping prompt information indicating a number of items to be received.

In some embodiments, as illustrated in FIG. 2, the application may be a shopping application E. When there are three items to be received in the shopping application E, the notification information may be information about the three items to be received, and the information display interface (as illustrated in FIG. 3) may be an item-to-be-received list interface containing the above information about the items to be received, and the key information may be prompt information indicating the number of items to be received. For example, the key information may be prompt information "3+ have been shipped".

It should be noted that, the prompt information may be other prompt information, for example, "3+ to be received", which is not limited here.

It should be noted that, when the application includes the shopping application, the notification information may include other types of information in addition to the type of information above, which is not limited here. In addition to the prompt information, the key information may include other prompt information, which is not limited here.

In some embodiments, the application includes a taxi-hailing application, the notification information includes information of a hailed taxi, and the key information includes taxi-hailing prompt information indicating an identifier of the hailed taxi.

In some embodiments, as illustrated in FIG. 2, the application may be a taxi-hailing application F. When the user orders a taxi on the taxi-hailing application F, the notification information may be hailed-taxi information such as a license plate number, a brand, a color and a driving path of a hailed taxi (that is, the above ordered taxi). The hailed-taxi information may also include other information, which is not limited here. The information display interface (as illustrated in FIG. 3) may be an interface that displays the above hailed-taxi information. The key information may be prompt information indicating an identifier of the hailed taxi. For example, the key information may be the license plate number of the hailed taxi ("***" in FIG. 2 represents the license plate number).

It should be noted that, when the application includes the taxi-hailing application, the notification information may include other types of information in addition to the type of information above, which is not limited here. In addition to the prompt information, the key information may include other prompt information, which is not limited here.

In some embodiments, the application includes a ticket-booking application, the notification information includes information of a booked ticket, and the key information includes ticket prompt information indicating an identifier of the booked ticket.

In some embodiments, as illustrated in FIG. 2, the application may include a ticket-booking application G. When there is ticket booking of the user in the ticket-booking application G, the notification information may include a duration from current time to a departure time corresponding to a booked ticket, train number information, a number of a ticket barrier, a waiting place, a seat number and other ticket-booking information, it may also include other information, which is not limited here. The information display interface (as illustrated in FIG. 3) may be an interface that displays the above ticket-booking information. The key information may be prompt information indicating an identifier of the booked ticket. For example, the key information may be a train number ("****" in FIG. 2 represents a train number).

It should be noted that, when the application includes the ticket-booking application, the notification information may include other types of information in addition to the type of information above, which is not limited here. In addition to the prompt information, the key information may include other prompt information, which is not limited here.

In addition, the information display interface may further include a control display interface corresponding to control information. The application may include an application for controlling a smart device, the control information may include at least one control item for controlling the started smart device, and the key information may include identification information indicating the started smart device. The identification information may be a model number, a serial number, a type, or the like of the started smart device, or may be an adjustment parameter that may be supported by the started smart device, which is not limited here. In addition, the control item may include a control button, or may include parameter display information adjusted by the control button, which is not limited here.

For example, when the started smart device is an air conditioner, the control information may include a temperature control item, a wind speed control item, a wind direction control item, and the like. The temperature control item may include a temperature adjustment button and target temperature display information corresponding to the temperature adjustment button.

In some embodiments, as illustrated in FIG. 2, the application may be an application H for controlling a smart device. When a smart device b is started, the control information (as illustrated in FIG. 3) may be a control item of the started smart device b. The information display interface may be a control display interface of the started smart device b. The key information may be identification information indicating the started smart device b. The identification information may be an adjustment parameter that may be supported by the smart device b. For example, the smart device b is an air conditioner, the target temperature set by the air conditioner is 26° C., and the identification information may be 26° C.

It should be noted that, in addition to the notification display interface corresponding to the notification information and the control display interface corresponding to the control information, the information display interface may also be other interfaces, which is not limited here.

With the method according to some embodiments of the disclosure, the user may make the display screen display a corresponding information display interface through the corner mark, which facilitates the user to open the information display interface more quickly, thus facilitating the user to know about the information on the information display interface and to operate on the information display interface, which improves the user experience.

Figure 4:
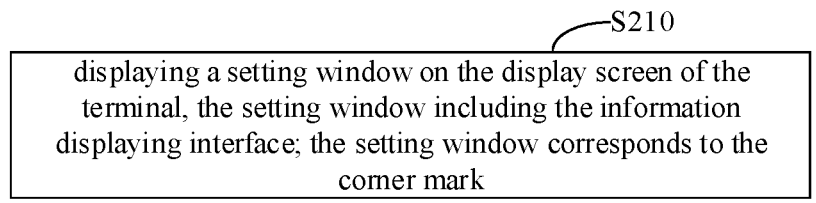
FIG. 4 is a flowchart illustrating a method for information display according to an embodiment of the disclosure.

In an embodiment, a method for information display is provided, and performed by a terminal. As illustrated in FIG. 4, in the method, displaying an information display interface on a display screen of the terminal may include step S210.

At S210, a setting window is displayed on the display screen of the terminal, the setting window including the information displaying interface, the setting window corresponds to the corner mark.

The terminal may configure the setting window for the corner mark, the setting window is configured to display an information display interface corresponding to the corner mark. When the terminal determines that a first control instruction for the corner mark is received, the information display interface may be displayed in the setting window of the display screen of the terminal. The setting window may be the same as the entire display area of the display screen, or may be smaller than the entire display area of the display screen, that is, the setting window may be displayed on the display screen in the form of a small window, which is not limited here.

It should be noted that, in a condition where the setting window is displayed on the display screen of the terminal, if the user operates on the information display interface in the setting window, which causes that a new interface is to be displayed, the new interface may cover the information display interface, that is, and the setting window may be replaced with the new interface.

In some embodiments, as illustrated in FIG. 2, the application may be a communication application D, and a corner mark is configured at the upper right corner of an icon of the communication application D. The communication application D includes two unread messages from a user little a, and the notification information may be the two unread messages. The information display interface may be an interface where the unread messages are located. For example, the information display interface may be a message list interface. The key information may be prompt information "2+ little a". That is, "2+ little a" is displayed in the corner mark.

In this embodiment, the user may long press the corner mark for more than 3 s, so that the terminal receives the first control instruction for the corner mark. Then, the display screen of the terminal may display the setting window (as illustrated in FIG. 3). The setting window includes the message list interface of the communication application D, and the message list interface includes two unread messages from the user little a.

The user may click an item corresponding to little a in the message list interface, so that a chat interface (not shown in FIG. 3) corresponding to little a is displayed in the setting window, so that the user knows about chat information and can reply the messages.

In some embodiments, as illustrated in FIG. 2, the application may be a shopping application E, and a corner mark is configured at the upper right corner of an icon of the shopping application E. There are three items to be received in the shopping application E, the notification information may be information of the three items to be received, and the information display interface may be an item-to-be-received list interface including the information of the three items to be received, and the key information may be prompt information "3+ have been shipped". That is, "3+ have been shipped" is displayed in the corner mark.

In this embodiment, the user may click the corner mark more than twice, so that the terminal receives the first control instruction for the corner mark. Then, the display screen of the terminal may display the setting window (as illustrated in FIG. 3). The setting window includes an item-to-be-collected list interface of the shopping application E, and the item-to-be-collected list interface includes information of the three items to be received.

The user may click an item of any item to be received in the item-to-be-collected list interface, so that a logistics interface (not shown in FIG. 3) corresponding to the item to be received is displayed in the setting window, so that the user knows about logistics information of the item to be collected.

With the method according to embodiments of the disclosure, the user may make the setting window of the display screen display the corresponding information display interface through the corner mark, which facilitates the user to open an information display interface more quickly, and to know about information in the information display interface. In addition, the user operates and controls the information display interface, so that detailed information is further displayed in the setting window, to facilitate the user's operation and improve the user experience.

Figure 5:
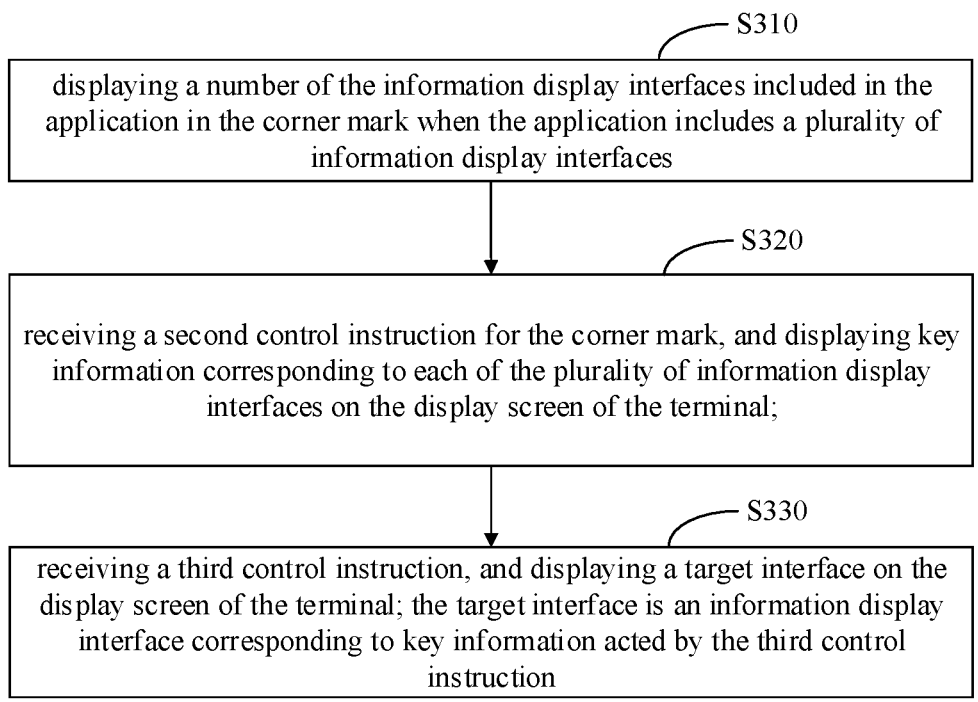
FIG. 5 is a flowchart illustrating a method for information display according to an embodiment of the disclosure.

In an embodiment, a method for information display is provided, and performed by a terminal. As illustrated in FIG. 5, the method may include steps S310-S330.

At S310, a number of the information display interfaces included in the application is displayed in the corner mark when the application includes a plurality of information display interfaces.

At S320, a second control instruction for the corner mark is received, and key information corresponding to each of the plurality of information display interfaces is displayed on the display screen of the terminal.

At S330, a third control instruction is received, and a target interface is displayed on the display screen of the terminal, the target interface is an information display interface corresponding to the key information acted by the third control instruction.

At S310, an application may include a plurality of information display interfaces simultaneously, at this time, the number of information display interfaces may be displayed in the corner mark.

In some embodiments, the application is a video application. The user saves three TV dramas in the favorites of the video application. When all of the three TV dramas are updated, the video application includes three information display interfaces of update information of the above three TV dramas. The corner mark corresponding to the video application may display a number "3", so that the user may timely know about the number of the updated favorite TV dramas.

It should be noted that, the application may be other types of application, and the information display interface may also be a display interface of other information, which is not limited here.

At block S320, an implementation of the second control instruction may refer to that of the first control instruction, which is not limited here. It should be noted that, the second control instruction and the first control instruction may be the same, or may be different, which is not limited here.

At block S302, when the terminal determines that the second control instruction for the corner mark is received, the key information corresponding to each of the plurality of information display interfaces may be displayed on the display screen of the terminal, to facilitate the user to know about the information in each information display interface in time.

In some embodiments, the application is a video application. The user saves three TV dramas in the favorites of the video application. When two of the three TV dramas are updated, the video application includes two information display interfaces of update information of the updated two TV dramas. In this situation, the corner mark corresponding to the video application may display a number "2", so that the user may timely know about the number of the updated favorite TV dramas.

In an implementation, after the terminal receives the second control instruction, key information of the above two information display interfaces may be displayed on the display screen of the terminal. The key information may be a name of a TV drama. That is, the names of the updated TV dramas may be displayed on the display screen of the terminal, so that the user knows about the names of the updated TV dramas in time.

It should be noted that, the application may be other applications, the information display interface may also be display interfaces of other information, and key information may be other information, which is not limited here.

At block S330, an implementation of the third control instruction may refer to that of the first control instruction, which is not limited here. The third control instruction differs from the first control instruction that the first control instruction is for the corner mark, and the third control instruction is for the key information.

At the block S330, after the terminal determines that the third control instruction is received, corresponding key information may be determined based on the third control instruction, and a corresponding information display interface is determined based on the determined key information. The determined information display interface may be denoted as the target interface, and the target interface is displayed on the display screen.

In some embodiments, the key information of the above two information display interfaces is displayed on the display screen of the terminal, denoted as first key information and second key information respectively. When the terminal receives the third control instruction acting on the second key information, the terminal may display an information display interface corresponding to the second key information on the display screen.

With the method according to the embodiments of the disclosure, more functions are provided for the corner mark and valid information of the corner mark is enhanced, which facilitates the user to perform quick operation and interaction, and improves the user experience.

Figure 6:
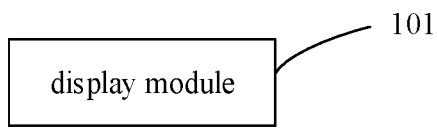
FIG. 6 is a block diagram illustrating an apparatus for information display according to an embodiment of the disclosure.

In an embodiment, an apparatus for information display is provided, and to the apparatus is implemented as a terminal. The apparatus is configured to perform the above method for information display. In an embodiment, as illustrated in FIG. 6, the apparatus may include a display module 101. In the process of executing the above method, the display module 101 is configured to:

display key information of an information display interface of an application in a corner mark corresponding to an icon of the application; and receive a first control instruction for corner mark, and display an information display interface on a display screen of the terminal.

In an embodiment, an apparatus for information display is provided, and implemented as a terminal. In the apparatus, the information display interface includes at least one of:

a notification display interface corresponding to notification information, and a control display interface corresponding to control information.

In an embodiment, an apparatus for information display is provided, and implemented as a terminal. In the apparatus:

the application includes a video application, the notification information includes video update information of a favorite video, and the key information includes update prompt information configured to prompt an update of the favorite video; and/or, the application includes an express application, the notification information includes information about a parcel to be picked up, and the key information includes express prompt information indicating a number of parcels to be picked up; and/or, the application includes a food delivery application, the notification information includes food delivery order information, and the key information includes food delivery prompt information indicating a remaining delivery distance of a food delivery order; and/or, the application includes a communication application, the notification information includes an unread message, and key information includes communication prompt information indicating a number of the unread messages and/or a sender; and/or, the application includes a shopping application, the notification information includes information about an item to be received, and the key information includes shopping prompt information indicating a number of items to be received; and/or, the application includes a taxi-hailing application, the notification information includes information of a hailed taxi, and the key information includes taxi-hailing prompt information indicating an identifier of the hailed taxi; and/or, the application includes a ticket-booking application, the notification information includes information of a hailed taxi, and the key information includes ticket prompt information indicating an identifier of the booked ticket.

In an embodiment, an apparatus for information display is provided, and implemented as a terminal. In the apparatus:

the application includes an application for controlling a smart device, the control information includes at least one control item for controlling the started smart device, and the key information includes identification information indicating the started smart device.

In an embodiment, an apparatus for information display is provided, and implemented as a terminal. As illustrated in FIG. 6, in the apparatus, the display module 101 is configured to:

display a setting window on the display screen of the terminal, the setting window including the information displaying interface; the setting window corresponds to the corner mark.

In an embodiment, an apparatus for information display is provided, and implemented as a terminal. As illustrated in FIG. 6, in the apparatus, the display module 101 is configured to:

display a number of the information display interfaces included in the application in the corner mark when the application includes a plurality of information display interfaces;

receive a second control instruction for the corner mark, and display key information corresponding to each of the plurality of information display interfaces on the display screen of the terminal; and receive a third control instruction, and display a target interface on a display screen of the terminal; and the target interface is an information display interface corresponding to the key information acted by the third control instruction.

In an embodiment, an apparatus for information display is provided, and implemented as a terminal. In the apparatus, the corner mark is located at a preset position on the icon of the application. The preset position includes at least one of:

an upper left corner, an upper right corner, a lower left corner and a lower right corner.

In an example, a terminal is provided. For example, the terminal may be a mobile phone, a computer, a wearable device, which is not limited here.

Figure 7:
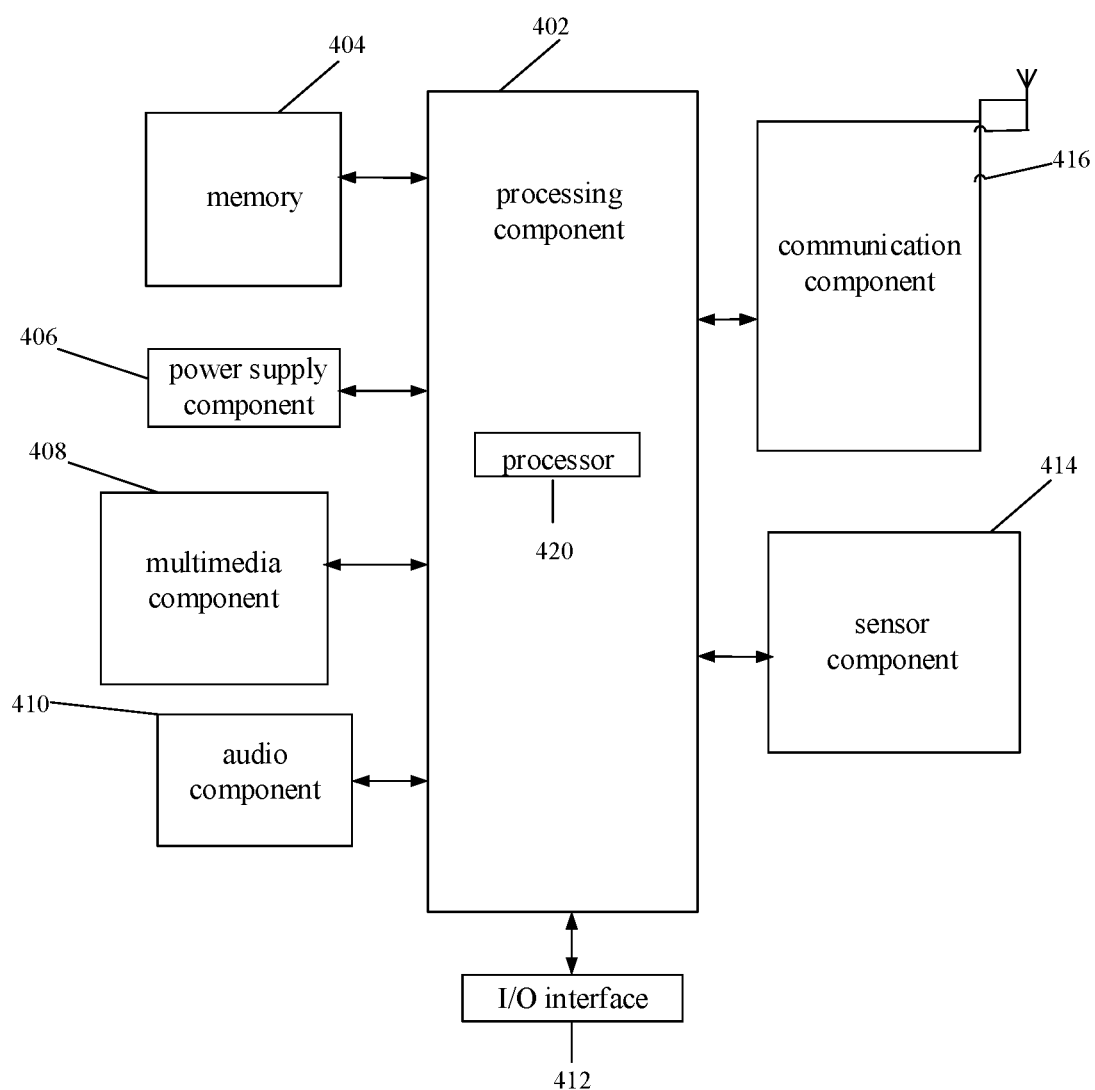
FIG. 7 is a block diagram illustrating a terminal according to an embodiment of the disclosure.

As illustrated in FIG. 7, the terminal 400 may include one or more components: a processing component 402, a memory 404, a power supply component 406, a multimedia component 408, an audio component 410, an input/output (I/O) interface 412, a sensor component 414, and a communication component 416.

The processing component 402 generally controls the whole operation of the terminal 400, such as the operations related to display, phone call, data communication, camera operation and recording operation. The processing component 402 may include one or more processors 420 to perform instructions, to complete all or part of blocks of the above method. In addition, the processing component 402 may include one or more modules for the convenience of interaction between the processing component 402 and other components. For example, the processing component 402 may include a multimedia module for the convenience of interaction between the multimedia component 408 and the processing component 402.

The memory 404 is configured to store various types of data to support the operation of the terminal 400. Examples of the data include the instructions of any applications or methods operated on terminal 400, contact data, phone book data, messages, pictures, videos, etc. The memory 404 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The electrical component 406 may provide power for all components of the terminal 400. The electrical component 406 may include power supply management system, one or more power supplies, and other units related to generating, managing and distributing power for the terminal 400.

The multimedia component 408 includes an output interface screen provided between the terminal 400 and the user. In some embodiments, a screen may include a liquid crystal display (LCD) and a touch panel (TP). When the screen includes a touch panel, the screen may be implemented as a touch screen to receive an input instruction from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 408 includes a front camera and/or a rear camera. When the terminal 400 is in operation mode, such as shooting mode or video mode, the front camera or the rear camera may receive the external multimedia data. Each front camera and rear camera may be a fixed optical lens system or an optical lens system with a focal length and an optical zoom capacity.

The audio component 410 is configured as outputting and/or inputting audio instruction. For example, the audio component 410 includes a microphone (MIC). When the terminal 400 is in an operation mode, such as call mode, record mode, and speech recognition mode, the microphone is configured to receive an external audio instruction. The audio instruction received may be further stored in the memory 404 or sent via the communication component 416. In some embodiments, the audio component 410 further includes a speaker configured to output an audio instruction.

The I/O interface 412 provides an interface for the processing component 402 and the peripheral interface module, and the peripheral interface module may be a keyboard, a click wheel, a button, etc. The buttons may include but not limited to a home button, a volume button, a start button and a lock button.

The sensor component 414 includes one or more sensors, configured to provide various aspects of status assessment for the terminal 400. For example, the sensor component 414 may detect the on/off state of the terminal 400 and the relative positioning of the component. For example, the component is a display and a keypad of the terminal 400. The sensor component 414 may further detect the location change of the terminal 400 or one component of the terminal 400, the presence or absence of contact between the user and the terminal 400, the orientation or acceleration/deceleration of the terminal 400, and the temperature change of the terminal 400. The sensor component 414 may include a proximity sensor, which is configured to detect the existence of the objects nearby without any physical contact. The sensor component 414 may further include a light sensor such as CMOS or CCD image sensor, which is configured to use in imaging applications. In some embodiments, the sensor component 414 may further include an acceleration transducer, a gyroscope sensor, a magnetic sensor, a pressure sensor or a temperature sensor.

The communication component 416 is configured for the convenience of wire or wireless communication between the terminal 400 and other devices. The terminal 400 may access wireless networks based on communication standard, such as WiFi, 2G or 3G, or their combination. In an example embodiment, the communication component 416 receives broadcast instruction or broadcast-related information from an external broadcast management system via a broadcast channel. In an exemplary embodiment, the communication component 416 further includes a near field communication (NFC) module to facilitate short-range communication. For example, an NFC module may be implemented based on radio frequency identification (RFID) technology, infrared data association (IRDA) technology, ultra-wideband (UWB) technology, bluetooth (BT) technology and other technologies.

In an example embodiment, the terminal 400 may be implemented by one or more application specific integrated circuits (ASIC), digital instruction processors (DSP), digital instruction processing devices (DSP D), programmable logic devices (PLD), field programmable gate arrays (FPGA), controllers, microcontrollers, microprocessors or other electronics components, which is configured to perform the above method.

In an embodiment, a non-temporary computer readable storage medium is further provided which includes instructions, such as the memory 404 including instructions, in which the instructions may be executed by the processor 420 of the terminal 400 to complete the above methods. For example, the non-transitory computer readable storage medium may be a ROM, a random access memory (RAM), a CD-ROM, a magnetic tape, a floppy disk, an optical data storage device, etc. A terminal may perform the method as described in the above embodiments when instructions in the storage medium are executed by the processor of the terminal.

After considering the specification and practicing the disclosure here, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims.

What is claimed is:

1. A method for information display, performed by a terminal, comprising:
   displaying key information of an information display interface of an application in a corner mark corresponding to an icon of the application; and
   receiving a first control instruction for the corner mark, and displaying the information display interface on a display screen of the terminal;
   wherein the information display interface comprises a notification display interface corresponding to notification information;
   wherein the application, the notification information and the key information may be set as at least one of:
   the application comprises a video application, the notification information comprises video update information of a favorite video, and the key information comprises update prompt information configured to prompt an update of the favorite video;
   the application comprises an express application, the notification information comprises information about a parcel to be picked up, and the key information comprises express prompt information indicating a number of parcels to be picked up;
   the application comprises a food delivery application, the notification information comprises food delivery order information, and the key information comprises food delivery prompt information indicating a remaining delivery distance of a food delivery order;
   the application comprises a communication application, the notification information comprises an unread message, and the key information comprises communication prompt information indicating one or both of a number of unread messages or a sender;
   the application comprises a shopping application, the notification information comprises information about an item to be received, and the key information comprises shopping prompt information indicating a number of items to be received;
   the application comprises a taxi-hailing application, the notification information comprises information of a hailed taxi, and the key information comprises taxi-hailing prompt information indicating an identifier of the hailed taxi; and
   the application comprises a ticket-booking application, the notification information comprises information of a booked ticket, and the key information comprises ticket prompt information indicating an identifier of the booked ticket.

2. The method of claim 1, wherein the information display interface further comprises:
   a control display interface corresponding to control information.

3. The method of claim 2, wherein,
   the application comprises an application for controlling a smart device, the control information comprises at least one control item for controlling a started smart device, and the key information comprises identification information indicating the started smart device.

4. The method of claim 1, comprising:
   displaying a number of the information display interfaces comprised in the application in the corner mark in response to the application comprising a plurality of information display interfaces;
   receiving a second control instruction for the corner mark, and displaying key information corresponding to each of the plurality of the information display interfaces on the display screen of the terminal; and
   receiving a third control instruction, and displaying a target interface on the display screen of the terminal; wherein the target interface is an information display interface corresponding to key information acted by the third control instruction.

5. The method of claim 1, wherein the corner mark is located at a preset position on the icon of the application, the preset position comprises at least one of:
   an upper left corner, an upper right corner, a lower left corner and a lower right corner.

6. The method of claim 1, wherein displaying the information display interface on the display screen of the terminal comprises:
   displaying a setting window on the display screen of the terminal, the setting window comprising the information displaying interface; wherein the setting window corresponds to the corner mark.

7. A terminal, comprising:

a processor;

a memory configured to store instructions executable by the processor;

wherein the processor is configured to perform a method for information display, the method comprising:

displaying key information of an information display interface of an application in a corner mark corresponding to an icon of the application; and receiving a first control instruction for the corner mark, and displaying the information display interface on a display screen of the terminal;

wherein the information display interface comprises a notification display interface corresponding to notification information;

wherein the application, the notification information and the key information may be set as at least one of:

the application comprises a video application, the notification information comprises video update information of a favorite video, and the key information comprises update prompt information configured to prompt an update of the favorite video;

the application comprises an express application, the notification information comprises information about a parcel to be picked up, and the key information comprises express prompt information indicating a number of parcels to be picked up;

the application comprises a food delivery application, the notification information comprises food delivery order information, and the key information comprises food delivery prompt information indicating a remaining delivery distance of a food delivery order;

the application comprises a communication application, the notification information comprises an unread message, and the key information comprises communication prompt information indicating one or both of a number of unread messages or a sender;

the application comprises a shopping application, the notification information comprises information about an item to be received, and the key information comprises shopping prompt information indicating a number of items to be received;

the application comprises a taxi-hailing application, the notification information comprises information of a hailed taxi, and the key information comprises taxi-hailing prompt information indicating an identifier of the hailed taxi; and the application comprises a ticket-booking application, the notification information comprises information of a booked ticket, and the key information comprises ticket prompt information indicating an identifier of the booked ticket.

8. The terminal of claim 7, wherein the information display interface further comprises:

a control display interface corresponding to control information.

9. The terminal of claim 8, wherein, the application comprises an application for controlling a smart device, the control information comprises at least one control item for controlling a started smart device, and the key information comprises identification information indicating the started smart device.

10. The terminal of claim 7, comprising:

displaying a number of the information display interfaces comprised in the application in the corner mark in response to the application comprising a plurality of information display interfaces;

receiving a second control instruction for the corner mark, and displaying key information corresponding to each of the plurality of the information display interfaces on the display screen of the terminal; and receiving a third control instruction, and displaying a target interface on the display screen of the terminal; wherein the target interface is an information display interface corresponding to key information acted by the third control instruction.

11. The terminal of claim 7, wherein the corner mark is located at a preset position on the icon of the application, the preset position comprises at least one of:

an upper left corner, an upper right corner, a lower left corner and a lower right corner.

12. The terminal of claim 7, wherein displaying the information display interface on the display screen of the terminal comprises:

displaying a setting window on the display screen of the terminal, the setting window comprising the information displaying interface; wherein the setting window corresponds to the corner mark.

13. A non-transitory computer readable storage medium, wherein when instructions in the storage medium are executed by a processor of a terminal, the terminal is caused to perform a method for information display, the method comprising:

displaying key information of an information display interface of an application in a corner mark corresponding to an icon of the application; and receiving a first control instruction for the corner mark, and displaying the information display interface on a display screen of the terminal;

wherein the information display interface comprises a notification display interface corresponding to notification information;

wherein the application, the notification information and the key information may be set as at least one of:

the application comprises a video application, the notification information comprises video update information of a favorite video, and the key information comprises update prompt information configured to prompt an update of the favorite video;

the application comprises an express application, the notification information comprises information about a parcel to be picked up, and the key information comprises express prompt information indicating a number of parcels to be picked up;

the application comprises a food delivery application, the notification information comprises food delivery order information, and the key information comprises food delivery prompt information indicating a remaining delivery distance of a food delivery order;

the application comprises a communication application, the notification information comprises an unread message, and the key information comprises communication prompt information indicating one or both of a number of unread messages or a sender;

the application comprises a shopping application, the notification information comprises information about an item to be received, and the key information comprises shopping prompt information indicating a number of items to be received;

the application comprises a taxi-hailing application, the notification information comprises information of a hailed taxi, and the key information comprises taxi-hailing prompt information indicating an identifier of the hailed taxi; and the application comprises a ticket-booking application, the notification information comprises information of a booked ticket, and the key information comprises ticket prompt information indicating an identifier of the booked ticket.

14. The non-transitory computer readable storage medium of claim 13, wherein the information display interface further comprises:
    a notification display interface corresponding to notification information; and
    a control display interface corresponding to control information.

15. The non-transitory computer readable storage medium of claim 14, wherein,
    the application comprises an application for controlling a smart device, the control information comprises at least one control item for controlling a started smart device, and the key information comprises identification information indicating the started smart device.

16. The non-transitory computer readable storage medium of claim 13, comprising:
    displaying a number of the information display interfaces comprised in the application in the corner mark in response to the application comprising a plurality of information display interfaces;
    receiving a second control instruction for the corner mark, and displaying key information corresponding to each of the plurality of the information display interfaces on the display screen of the terminal; and
    receiving a third control instruction, and displaying a target interface on the display screen of the terminal; wherein the target interface is an information display interface corresponding to key information acted by the third control instruction.

17. The terminal of claim 13, wherein displaying the information display interface on the display screen of the terminal comprises:
    displaying a setting window on the display screen of the terminal, the setting window comprising the information displaying interface; wherein the setting window corresponds to the corner mark.

* * * * *